US012596636B2

(12) United States Patent
Jari et al.

(10) Patent No.: US 12,596,636 B2
(45) Date of Patent: Apr. 7, 2026

(54) AUTOMATIC GENERATION OF COMMON ASSET VALIDATION TESTS FOR PLATFORM-BASED MICROSERVICES

(71) Applicant: PAYPAL, INC., San Jose, CA (US)

(72) Inventors: Shivam Jari, Bengaluru (IN); Prabin Patodia, Bangalore (IN)

(73) Assignee: PAYPAL, INC., San Jose, CA (US)

( * ) Notice: Subject to any disclaimer, the term of this patent is extended or adjusted under 35 U.S.C. 154(b) by 238 days.

(21) Appl. No.: 18/584,383

(22) Filed: Feb. 22, 2024

(65) Prior Publication Data

US 2024/0202107 A1 Jun. 20, 2024

Related U.S. Application Data

(63) Continuation-in-part of application No. 18/068,680, filed on Dec. 20, 2022, now Pat. No. 12,131,201.

(51) Int. Cl.
*G06F 11/3668* (2025.01)

(52) U.S. Cl.
CPC ...... *G06F 11/3684* (2013.01); *G06F 11/3688* (2013.01)

(58) Field of Classification Search
None
See application file for complete search history.

(56) References Cited

U.S. PATENT DOCUMENTS 9,778,964 B1 * 10/2017 Mowatt ............... G06F 9/44505
11,785,280 B1 * 10/2023 Dakss .............. H04N 21/43079
725/37

(Continued)

FOREIGN PATENT DOCUMENTS

CN 113806432 A 12/2021

OTHER PUBLICATIONS

Polenghi, "Conceptual Framework for a Data Model to Support Asset Management Decision-Making Process", 2019, IFIP International Federation for Information Processing (Year: 2019).*

(Continued)

*Primary Examiner* — Hossain M Morshed
(74) *Attorney, Agent, or Firm* — Haynes and Boone, LLP

(57) ABSTRACT

There are provided systems and methods for automatic generation of common asset validation tests for platform-based microservices. A service provider, such as an electronic transaction processor for digital transactions, may utilize different decision services that implement rules or artificial intelligence models for decision-making from data in a production computing environment. A decision service may normally be used for data processing and decision-making through an execution flow configuration or graph identifying a flow of task executions and other computing operations. In this regard, the decision services may share common data assets, such as data tables, shared code for execution of operations and the like. The service provider may utilize an intelligent service to automatically generate tests that validate the common assets for usage by and deployment with decision services. The tests may be generated from existing tests by reconfiguring for test requirement parameters of each decision service.

20 Claims, 9 Drawing Sheets

(56)                    References Cited

U.S. PATENT DOCUMENTS

| | | | | |
|---|---|---|---|---|
| 2008/0127081 A1* | 5/2008 | Schumann | ................ | G06F 8/10 |
| | | | | 717/120 |
| 2010/0223211 A1* | 9/2010 | Johnson | ............. | G06Q 10/0637 |
| | | | | 706/11 |
| 2010/0293007 A1* | 11/2010 | Schoenberg | ........... | G16H 40/63 |
| | | | | 705/2 |
| 2011/0289440 A1* | 11/2011 | Carter | ................. | H04L 43/0876 |
| | | | | 709/224 |
| 2013/0073504 A1* | 3/2013 | Mohindra | ................ | G06N 5/02 |
| | | | | 706/46 |
| 2014/0250306 A1* | 9/2014 | Ziegler | ................... | H04L 63/20 |
| | | | | 726/17 |
| 2016/0127564 A1* | 5/2016 | Sharma | ................. | H04M 15/65 |
| | | | | 455/406 |
| 2017/0353529 A1* | 12/2017 | Harpur | ................. | H04L 67/306 |
| 2018/0084056 A1* | 3/2018 | Mowatt | ............... | H04L 61/4547 |
| 2020/0159638 A1* | 5/2020 | Gupta | ................. | H04L 63/1408 |
| 2022/0066767 A1* | 3/2022 | Kumar | ...................... | G06F 8/65 |
| 2022/0382655 A1* | 12/2022 | Patodia | ............. | G06Q 30/0241 |

OTHER PUBLICATIONS

Bon D., et al., "Analytics in a Decision Service Context Exploring Analytical Values for Enhancing Automated Decision Performance," Master Thesis 15 ECTS, INFM10, May 2017, 100 pages.

\* cited by examiner

Asset - Test Case Mapping 406

| Asset | Service | Test Case |
|---|---|---|
| Account | Service A, Service B | Link to Test Case |
| Bank | Service B | Link to Test Case |

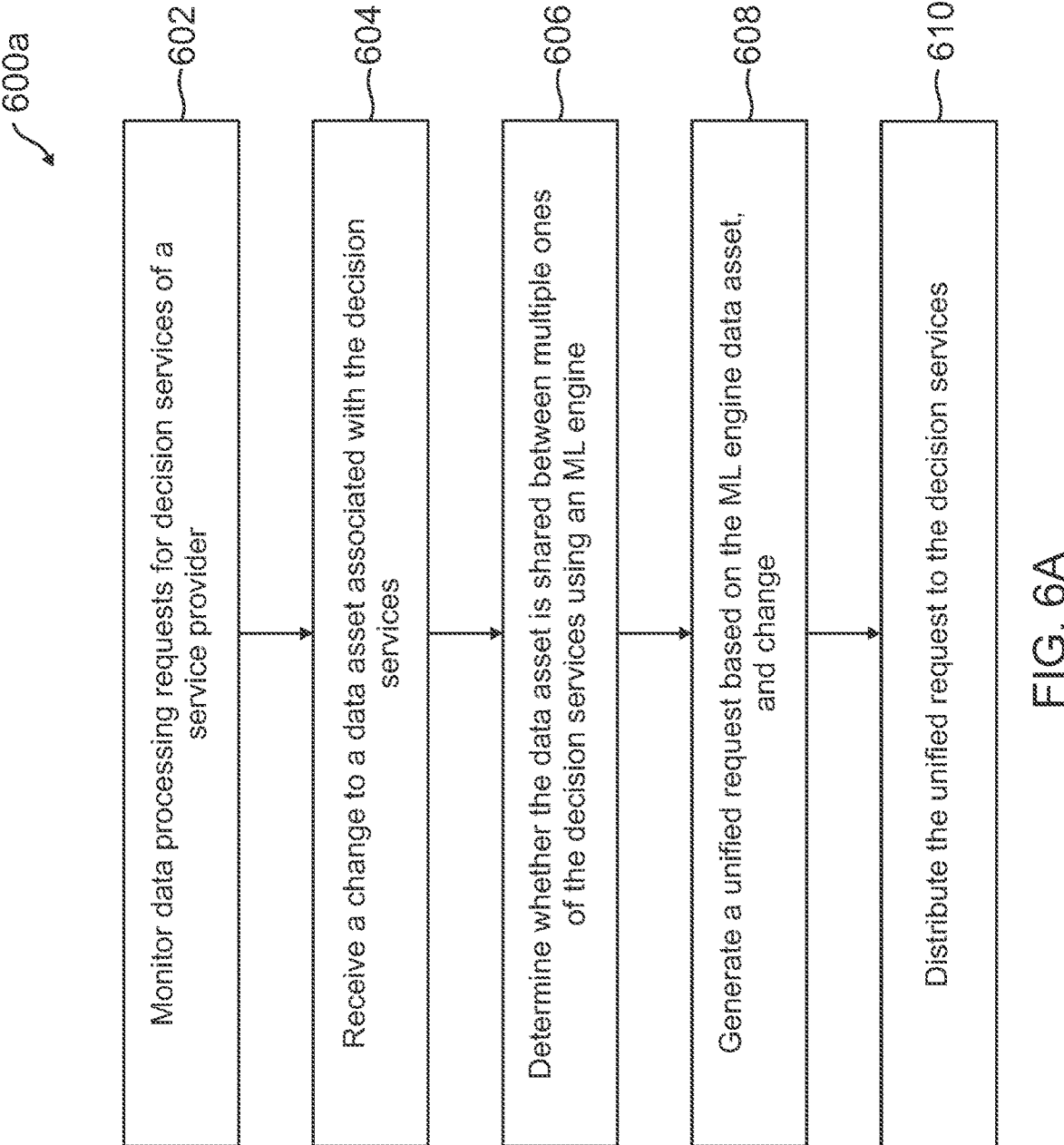

600a

602 Monitor data processing requests for decision services of a service provider 604 Receive a change to a data asset associated with the decision services 606 Determine whether the data asset is shared between multiple ones of the decision services using an ML engine 608 Generate a unified request based on the ML engine data asset, and change 610 Distribute the unified request to the decision services

FIG. 6A

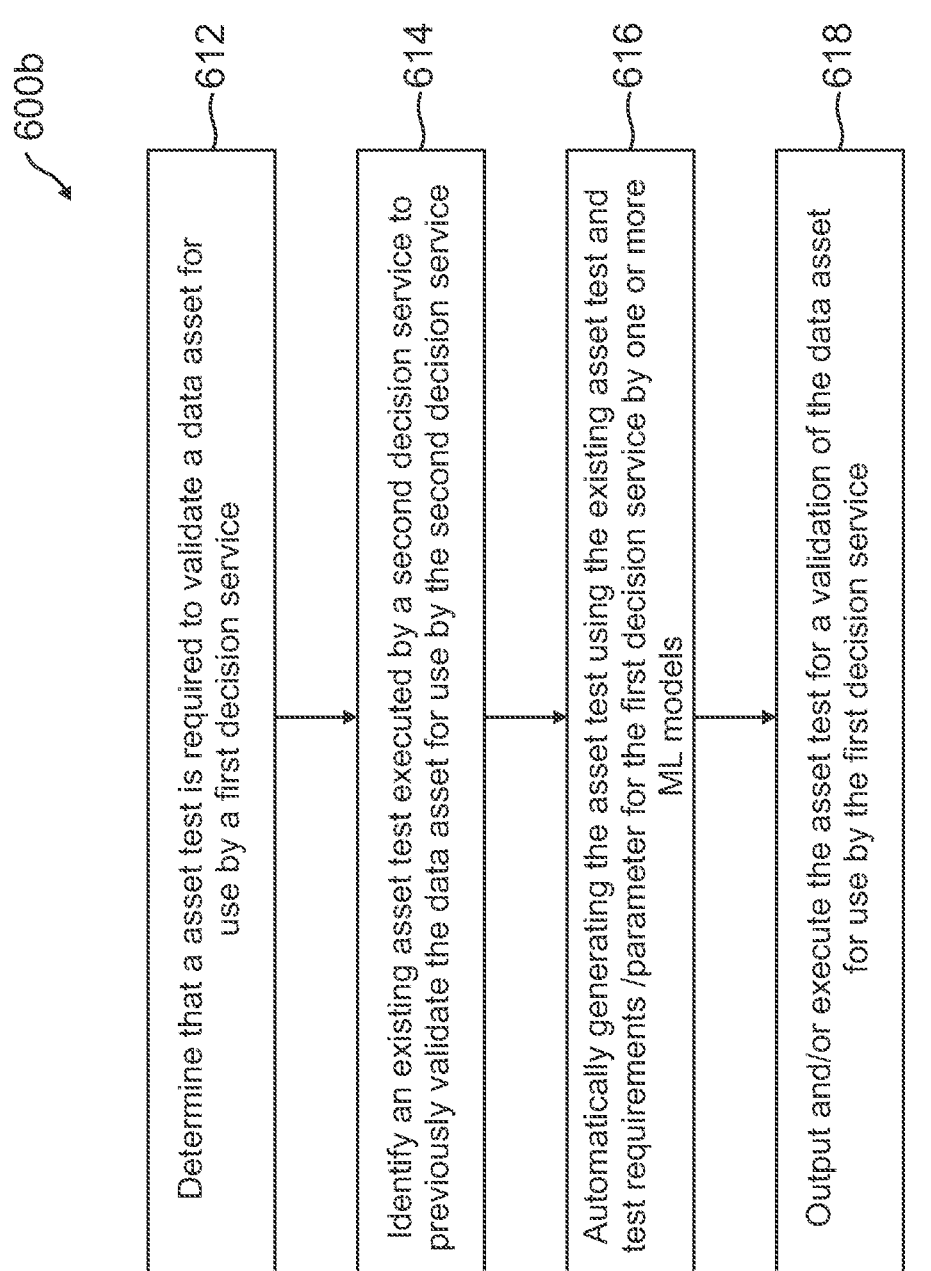

600b

612 — Determine that a asset test is required to validate a data asset for use by a first decision service 614 — Identify an existing asset test executed by a second decision service to previously validate the data asset for use by the second decision service 616 — Automatically generating the asset test using the existing asset test and test requirements /parameter for the first decision service by one or more ML models 618 — Output and/or execute the asset test for a validation of the data asset for use by the first decision service

FIG. 6B

AUTOMATIC GENERATION OF COMMON ASSET VALIDATION TESTS FOR PLATFORM-BASED MICROSERVICES

CROSS-REFERENCE TO RELATED APPLICATIONS

This application is a continuation-in-part of U.S. patent application Ser. No. 18/068,680, filed Dec. 20, 2022, which is incorporated by reference herein in its entirety.

TECHNICAL FIELD

The present application generally relates to testing shared data assets by different decision services, and more particularly to intelligently generating common asset validation tests using machine learning (ML) and other artificial intelligence (AI) models for execution by different decision services.

BACKGROUND

Online service providers may offer various services to end users, merchants, and other entities. This may include providing electronic transaction processing data flows, services, and other computing resources. Further, the service provider may provide and/or facilitate the use of online merchant marketplaces and/or transaction processing between different entities. When providing these computing services, the service provider may utilize decision services, which may correspond to micro-computing services having rules-based and/or machine learning-based engines, computing nodes, execution paths, and the like to process data requests and loads for different outputs (e.g., authentication, risk or fraud analysis, electronic transaction processing, etc.). In this regard, multiple microservices and other decision services depend on each other and operate together in a computing architecture. There may be also data and other computing code and/or assets shared between the services, such that, if duplicate assets are created, inefficiencies in the computing system and for developers and other code writers may be introduced.

For example, if a decision service utilizes the same or similar code to provide a computing task for the same or similar data load, it would be inefficient to prepare, execute, and/or store assets that perform the same or similar operations that may be shared between such services. A service provide may therefore provide common data assets, such as resources and/or calls or other operations to interact with resources that may be used to load and/or process data. However, common assets may not be created for each individual decision service, and thus new services and/or existing services introducing and/or utilizing a common asset are required to test the asset for proper use and deployment. This requires each decision service and/or administrator, coder, or data scientist managing a data service to come up with and code tests and run those tests, which requires significant time and resources. As such, it is desirable for service providers to automate generation of asset validation tests and provide faster and more efficient asset validation testing by decision services with lower resource usage (e.g., processing resources or power, time, storage, etc.).

BRIEF DESCRIPTION OF THE DRAWINGS

FIG. 6A is a flowchart of an exemplary process for automatically managing an asset validation framework for platform-based microservices, according to an embodiment;

FIG. 6B is a flowchart of an exemplary process for automatic generation of common asset validation tests for platform-based microservices, according to an embodiment.

Figure 1:
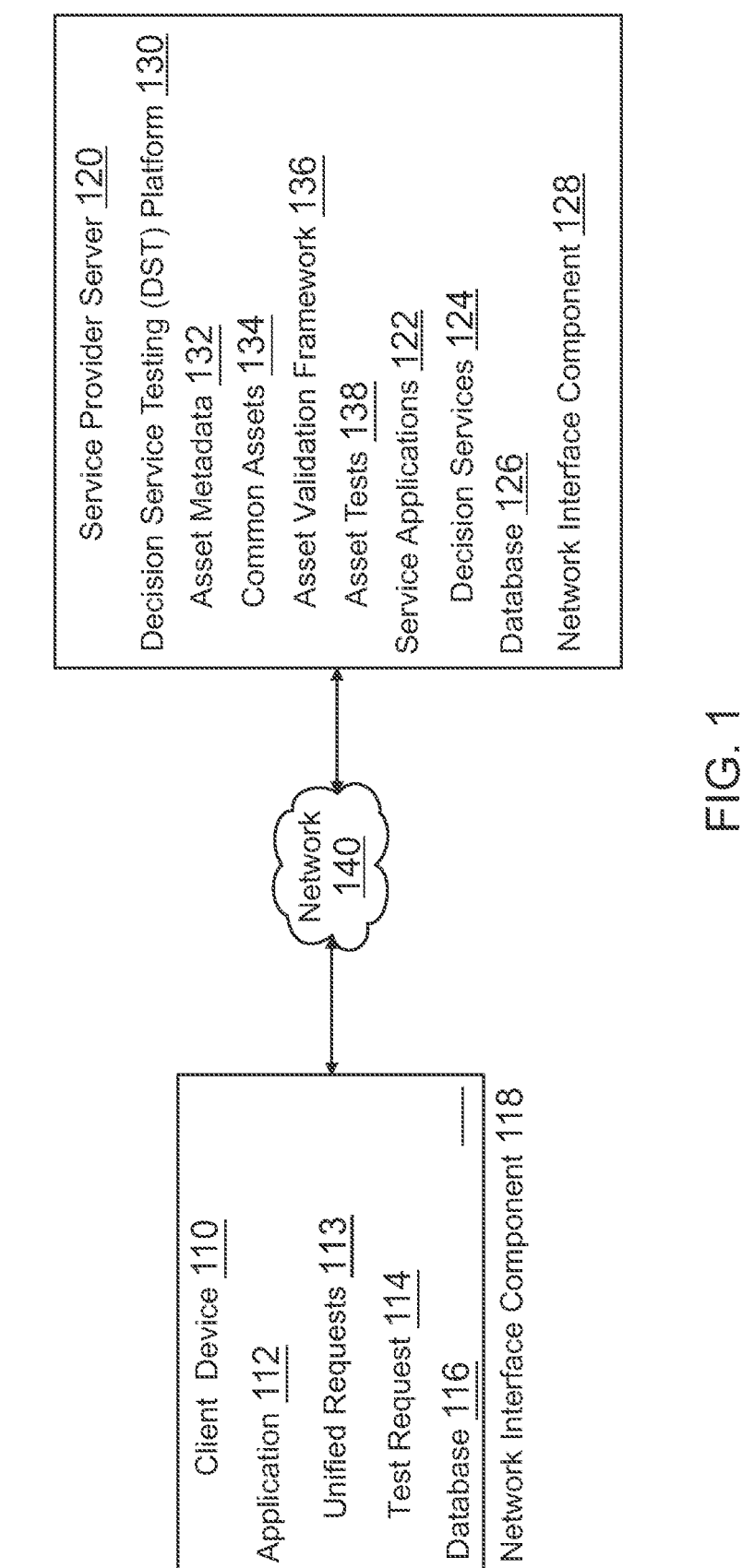
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for automatic generation of common asset validation tests for platform-based microservices. Systems suitable for practicing methods of the present disclosure are also provided.

A user may utilize online service providers, such as transaction processors, via their available online and networked platforms. For example, a user may make a payment to another user or otherwise transfer funds using the online platforms of the service providers. In this regard, a user may wish to process a transaction, such as for a payment to another user or a transfer. A user may pay for one or more transactions using a digital wallet or other account with an online service provider or transaction processor (e.g., PayPal®). An account may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The account and/or digital wallet may be loaded with funds or funds may otherwise be added to the account or digital wallet. The application or website of the service provider, such as PayPal® or other online payment provider, may provide payments and the other transaction processing services via the account and/or digital wallet.

Once the account and/or digital wallet of the user is established, the user may utilize the account via one or more computing devices, such as a personal computer, tablet computer, mobile smart phone, or the like. The user may engage in one or more transactions with a recipient, such as a recipient account or digital wallet that may receive an amount of a payment. When engaging in these interactions, the service provider may provide decision services that may be used to process data requests and data loads and provide a decision or other output, which may be used in conjunction to provide computing services to users. In some environments and/or conditions, multiple decision services may utilize the same data load, such as an account balance, account login name, contact identifier, user input for the data request, profile or transaction history, or the like. A computing architecture may function to analyze requests for decisions service using machine learning (ML), neural network (NN), and other artificial intelligence (AI) engines in order to determine whether common computing assets may be updated between multiple decision services.

For example, a service provider may provide different computing resources and services to users through different websites, resident applications (e.g., which may reside locally on a computing device), and/or other online platforms. When utilizing the services of a particular service provider, the service provider may provide decision services for implementing rules and intelligent (e.g., ML or other AI-based) decision-making operations with such services. For example, an online transaction processor may provide services associated with electronic transaction processing, including account services, user authentication and verification, digital payments, risk analysis and compliance, and the like. These decision services may be used to determine if, when, and how a particular service may be provided to users. For example, risk rules may be utilized with a risk engine for a decision service to determine if an indication of fraud is present in a digital transaction and payment, and therefore to determine whether to proceed with processing the transaction or decline the transaction (as well as additional operations, such as request further authentication and/or information for better risk analysis). Thus, decision services automate repeatable decisions based on decision modeling capabilities so that computing services may execute and perform operations requested by a user's computing device.

In this regard, a decision service may include different data processing nodes or services (e.g., sub-services that are invoked by the main decision service), where each data processing node may include executable instructions to perform one or more computing tasks that process data from a data processing request and output a response. For example, computing tasks may correspond to executable code, operations, and/or models that may include a client device request processor, a compute for business rules, a data loader, a validation of a data load of the data processing request, a user authenticator, or a response builder for a decision by the decision service, although other tasks may also be used. In this regard, a decision service may include computing tasks that obtain an intended result based on a provided data load for a data processing request.

These computing tasks may be executed in an order and/or processing flow according to a directed acyclic graph (DAG) or another directed graph or ordering of the computing tasks for execution by the decision service. For example, a DAG or other graph may correspond to a flow between computing tasks that causes output of a decision. Computing tasks may be arranged in an order within a DAG depending on the decision service and/or data processing request, for example, so that certain computing tasks may execute and provide data for processing by later computing tasks. A data processing request may be a request from a client computing device, such as an end user or customer of the service provider system, which may request use of a computing service and provide a data load for processing. For example, a data processing request may be associated with a particular request for use of a service for account login, authentication, electronic transaction processing, risk or fraud, and other ones of the aforementioned computing services. The directed graph may therefore correspond to the execution flow and show the different execution paths for executing the computing tasks in series, parallel, or the like. This may include having nodes for computing tasks connected by edges to show the various paths (e.g., in series, parallel, start, end, etc.) for the execution flow of the decision service.

Testing a computing platform with the latest changes for all dependent services may not be practical or possible because of multiple team involvements for such decision services and platforms that may be required (e.g., for creating a test build with latest platform snapshot and/or computing code/build, setting up of a test environment, deployment, test execution and sharing of the report, etc.). Additionally, availability, priority and geographical location of different teams, computing resources, and/or computing centers that may add to the complexity of code changes. The changes made to a common or shared platform may also be frequent with new common platform versions released in quick succession, such as two or three times a week, making testing the changes difficult. In this regard, the operations may be performed by identifying and unifying requests between dependent decision services for use in test cases.

A test service may be created using the latest version of a common platform and may process the unified requests. When a change is performed to common assets before releasing to the common platform, an asset validation framework may be used to execute and run all the dependent services for the unified request against this test service in order to detect any spill over issues and causations by changes to computing code and updates based on the unified request(s). The generated unified request may contain common platform data from an execution context serialized into JSON or other data format. For service onboarding, there may be an addition of a unified request generator (e.g., a Unified Request Generator that has access to the test service details, configurations, URLs, etc.) as a dependency for the asset validation framework. Once the functional tests for any of the service runs, the unified request generator may access the execution context (e.g., common assets' data) and remove the unnecessary fields. This may further include adjusting and changing that data to create a unified request. The generated unified requests may then be placed inside the decision services by the unified request generator.

For example, a change may be made to a common asset, such as a shared piece of code, ML model, rules engine, or the like. For example, an account balance field and/or data record(s) (e.g., one or more data rows and/or tables) may be an asset that is commonly shared between decision services and considered a common platform asset utilized by multiple decision services. There may be an option to determine whether an account balance is negative or not (e.g., an account balance has defaulted or is overdrawn or not). If a first decision service may make a change and/or want to have values for the field in a database, table, or record for the field to be recorded and/or stored as 0 and 1 for true and false, the first decision service would need to modify the field, code for data recording, database storage parameters, and/or the like. The first service may modify the common asset and a new common platform version of the field would be deployed as a change to the common asset.

Thus, a change may be made in one of the common assets by a decision service, and a snapshot version of the common platform may be generated. Once the change is deployed, the test service and/or common platform may test the change against all decision services utilizing the common asset. The test service may then process the generated snapshot version for changes made and/or changes needed to be proliferated across different decision services utilizing the common or shared asset. Services consuming the common assets are therefore identified. A unified request may be generated and utilized to test the change against all services. All the identified services' unified requests specific to the changed common asset are then run against the test service. After the unified requests are run against the test service, results of the test may be validated. Any validated and/or failed results may then be detected.

In the event that any issues are identified with dependent services tests, the decision service changing the common asset is notified of the issues and its change is not merged to the common platform and/or updated. In case of successful sharing and updating of the common asset, the new common platform version may be released with the changes. Thus, when the common asset change is made by a service and the functional test is run to validate the changes, the unified request generator generates a new unified request containing the changes and replace the old requests. An action may be taken on based on issues identified, which may include training or retraining an ML or other AI model to identify and perform such changes across other platforms and/or decision services. The recommendation module for such an ML or other AI model may be based on the model data, which may make changes in the impacted services and notify the owners of the decision service and change.

Further, a new decision service that intends to use a shared resource or other shared data asset, or an existing service that has added a new feature to use a shared resource, may not be required to create asset tests for validating every shared resource those services use. Due to the necessity to implement tests and validate the new assets and/or changes to existing assets, developers often find test development to be a lengthy and time-consuming process. However, other services that use the same asset may have test coverage for that asset by having existing tests, either manually or automatically generated, such that writing the same or similar test again for a same shared resource but for the other service context is a redundant task. However, conversely by not ensuring test coverage for all the common assets used for every decision or other microservices may result in errors, bugs, or other issues in production computing environments.

As such, services onboarded to the asset validation framework may determine, execute, and run their asset tests for validations of newly introduced or changed data assets, thereby generating unique test cases and available asset tests for the service. The asset validation framework, apart from running the tests, may also keep metadata of the tests that have been run, on which asset those tests were run, and with which decision tests those tests were run to validate the use of the asset with that corresponding decision service. The asset test metadata may include the asset information and/or identification, with mappings to the service and other information, such as links to the test cases and/or asset tests run in the different service with which the assets were validated.

Thereafter, when a data asset is identified that does not have coverage in a new service or an existing service that has added a new feature, the asset validation framework may utilize the asset test metadata and the mappings to identify the services that have the test cases for the data asset identified and to be validated with the corresponding decision service. This may be done using an identifier component of the asset validation framework that parses or processes the metadata and/or mapping (e.g., a data table of the mapping of assets to decision services and asset tests), which may gather the data for available and previously run asset tests, and forward the data to an adapter component. The adapter component may then adapt the previously existing and run asset tests for the existing cases to the decision service and new validation with that service. In this regard, the adapter component may generate a new asset test for the decision service to be run to validate the data asset when introduced and used with that decision service.

For the adapter component to properly adapt an existing asset test to a new decision service and corresponding required validation of a data asset, data from the identifier component may be provided and fed to an AI module. The AI module may previously train an AI model, such as a NN or ML model to identify and perform changes required to adapt different asset tests to different decision services, for example, by training on historical data including past test cases and past adapted test cases for the decision services. The NN or ML model may suggest the test cases to the adapter component, which may check and remove unwanted code from the asset test per the decision service, merge code from different asset tests, and/or suggest or generate new code (e.g., using a generative AI) for additional asset tests and/or operations to perform during the asset test. As such, a new asset test may be generated in an automated manner and used to validate the data asset with a decision service without manually generating an asset test.

For example, a service A and a service B may use a common data asset. Service A may use data assets for an account and a bank (e.g., information or identifiers for a user's account/bank) as the shared resources or other data assets that may be obtained, called, or queried, while service B may similarly use the account data asset. Both service A and service B may have existing asset tests written for the common assets, which were previously run using the asset validation framework. As such, when a new service C onboards and uses the common asset "account" but does not have an asset test written, the asset validation framework may be used to automate generation of a new asset test for service C from those existing tests run by services A and B. The identifier component may identify the data asset not covered by service C and may utilize the mappings or other metadata to determine the decision services (services A and B) and links, pathways, storage paths, files, identifiers, or the like for the existing asset tests. The identifier component may gather such data and feed the data to the AI model, which may provide recommendations and/or other outputs on how to adapt the existing asset tests, such as how to configure the code and/or operations execute by the tests, to service C in order to validate usage of the shared asset by service C.

When recommending code changes and/or test configurations, the asset validation framework may use stored data from the asset tests run by services A and B previously and stored in the metadata file or table. When service C onboards and seeks the new asset test, the AI module or corresponding NN or ML model may predict or intelligently understand the adaptations previously made in the past between different asset tests to have run by the different services (e.g., the differences between asset tests run by services A, B, or others for the particular data asset, as well as other asset tests run by service C and/or other services), which may be used to train the NN or ML model for predicting future adaptations. The AI module may collect this historical data from the identifier and the adapter, including original test cases from service A and service B and the adapted test cases for service C.

As such, during the inference stage when providing recommendations on test case adaptation to the adapter component, the collected data may be tokenized, parameters added or removed, and relevant information extracted. Thereafter, the data may be input to the model for the original test cases for new test case generation. The AI module may compare the test cases, adaption suggestions, and the like, and may use reinforcement learning to train for better quality test case adaptation, which may improve the model over time. This may be done with a feedback loop for AI adaptation suggestions for positive reinforcement. Adaptations may be provided to the adapter component, which may configure computing code for one or more existing asset tests (e.g., by configuring, updating, or changing existing code) and/or generating new code, and a new test case for service C may be output for validation. Service C may then run the validation test(s) to properly test the data asset for use and implementation when executing strategies for decision service outputs and decisions on data processing requests received.

As such, an asset validation framework for asset deployment, validation, and testing may allow for early detection of possible issues, additional time to address and/or fix such issues, automatic deployment of changes in different decision services and common shared assets, and less computing load on testing computing and network resources and operations. The asset validation framework eliminates or reduces the need for manual efforts when deploying new common data assets shared by different decision and other computing services, such as microservices executed to provide decisioning in production computing environments based on live and/or streamed data. Further, by configuring and generating new asset validation tests without manually coding and creating, additional resources used by new and/or overlapping tests may be significantly reduced, providing a more efficient computing environment and decision system.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, standalone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110 and a service provider server 120 in communication over a network 140. Client device 110 may be utilized by a user to access computing services or resources provided by service pro-vider server 120, where service provider server 120 may provide various data, operations, and other functions to client device 110 via network 140. The computing services may utilize decision services and/or other microservices for decision-making during data processing. In this regard, client device 110 may be used to access a website, application, or other platform that provides computing services. As such, service provider server 120 may provide computing services that process data and provide decisions in response to data processing requests via decision services, where an asset validation framework for the decision services may be implemented to provide automatically managed and validated common assets and automatic generation of asset validation tests across different decision services.

Client device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Client device 110 may be implemented as a communication device that may utilize appropriate hardware and software configured for wired and/or wireless communication with service provider server 120. For example, in one embodiment, client device 110 may be implemented as a personal computer (PC), a smart phone, laptop/tablet computer, wristwatch with appropriate computer hardware resources, eyeglasses with appropriate computer hardware (e.g., GOOGLE GLASS® and/or other headsets including metaverse configured headsets), other type of wearable computing device, implantable communication devices, and/or other types of computing devices capable of transmitting and/or receiving data. Although only one device is shown, a plurality of devices may function similarly and/or be connected to provide the functionalities described herein.

Client device 110 of FIG. 1 contains an application 112, a database 116, and a network interface component 118. Application 112 may correspond to executable processes, procedures, and/or applications with associated hardware. In other embodiments, client device 110 may include additional or different modules having specialized hardware and/or software as required.

Application 112 may correspond to one or more processes to execute software modules and associated components of client device 110 to provide features, services, and other operations for a user over network 140, which may include accessing and utilizing computing services provided by service provider server 120. In this regard, application 112 may correspond to specialized software utilized by a user of client device 110 that may be used to access a website or application (e.g., mobile application, rich Internet application, or resident software application) that may display one or more user interfaces that allow for interaction with the computing services of service provider server 120. In this regard, application 112 may correspond to specialized software utilized by client device 110 that may be used to access a website and interfaces (e.g., via a browser application, mobile application, rich Internet application, or resident software application) that may display one or more user interfaces that allow for interaction with the computing services of service provider server 120. As such, in various embodiments application 112 may correspond to a general browser application configured to retrieve, present, and communicate information over the Internet (e.g., utilize resources on the World Wide Web) or a private network. However, in other embodiments, application 112 may include a dedicated application of service provider server 120 or other entity that may access data for, present, and process a request, such as a test request 114, via one or more interfaces.

Application 112 may be associated with account information, user financial information, and/or transaction histories. However, in further embodiments, different services may be provided via application 112, including social networking, media posting or sharing, microblogging, data browsing and searching, online shopping, and other services available through service provider server 120. Thus, application 112 may correspond to and/or utilize different computing services provided by service provider server 120. When utilizing application 112 with service provider server 120, application 112 may provide and/or request processing of test request 114. Test request 114 may correspond to updating a decision service, deploying of an asset with a decision service and/or for availability for decision services, or other changes to one or more common assets that may be utilized by decision services, which may affect a common asset that is commonly processed between different decision services and therefore, when deployed with a new decision service, requires testing for validation by the service. Test request 114 may have a corresponding test or data load that is processed via one or more decision services of service provider server 120 for testing and validating a corresponding data asset, as well as code changes and the like that may affect the data asset.

As such, application 112 may be used with the decision services of service provider server 120, which may provide processing of unified requests 113 to adjust, change, and/or revise shared assets between decision services, as well as test and validate such common assets for decision service deployment. Test request 114 may be provided to service provider server 120 for processing, which may be used to deploy and/or test common assets that change code to one or more decision services for the execution of such decision services, such as when loading and processing data from one or more data resources. However, where common assets may be deployed and service provider server 120 may automatically and intelligently update decision services with new assets and deploy such assets, test request 114 may not include an explicit request to test and validate a common asset with a specific decision service. For example, instead test request 114 may include a request to provide and deploy a common asset and/or code for the asset, update or change such asset and/or code, or the like.

In various embodiments, client device 110 includes other applications as may be desired in particular embodiments to provide features to client device 110. For example, the other applications may include security applications for implementing client-side security features, programmatic client applications for interfacing with appropriate application programming interfaces (APIs) over network 140, or other types of applications. The other applications may also include email, texting, voice and IM applications that allow a user to send and receive emails, calls, texts, and other notifications through network 140. In various embodiments, the other applications may include financial applications, such as banking applications. Other applications may include social networking applications, media viewing, and/or merchant applications.

The other applications may also include other location detection applications, which may be used to determine a location for the user, such as a mapping, compass, and/or GPS application, which can include a specialized GPS receiver that determines location information for client device 110. The other applications may include device interface applications and other display modules that may receive input from the user and/or output information to the user. For example, the other applications may contain software programs, executable by a processor, including a graphical user interface (GUI) configured to provide an interface to the user. The other applications may therefore use devices of client device 110, such as display devices capable of displaying information to users and other output devices, including speakers.

Client device 110 may further include or be associated with database 116, which may store various applications and data and be utilized during execution of various modules of client device 110. Databases 116 may correspond to different types of data storage and components including cloud computing storage nodes, remote data stores and database systems, distributed database systems over network 140, and the like used to store various applications and data. Database 116 may include, for example, identifiers such as operating system registry entries, cookies associated with application 112 and/or the other applications, identifiers associated with hardware of client device 110, or other appropriate identifiers, such as identifiers used for payment/user/device authentication or identification, which may be communicated as identifying the user/client device 110 to service provider server 120. Moreover, database 116 may include data used for test request 114, such as data that may be provided as a data load processed by service provider server 120.

Client device 110 includes at least one network interface component 118 adapted to communicate with service provider server 120 and/or other devices and servers over network 140. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide computing services that utilize decision services for decision-making in an intelligent system to provide responses, output, and/or results to client device 110 based on data processing requests. In this regard, service provider server 120 includes one or more processing applications which may be configured to interact with client device 110. For example, service provider server 120 may deploy decision services that include intelligent decision services that may automatically manage common asset changes between different decision services including providing asset tests for validating and deploying common assets with the decision services. In one example, service provider server 120 may be provided by PAYPAL®, Inc. of San Jose, CA, USA. However, in other embodiments, service provider server 120 may be maintained by or include another type of service provider.

Service provider server 120 of FIG. 1 includes a decision service testing (DST) platform 130, service applications 122, a database 126, and a network interface component 128. DST platform 130 and service applications 122 may correspond to executable processes, procedures, and/or applications with associated hardware. In other embodiments, service provider server 120 may include additional or different modules having specialized hardware and/or software as required.

DST platform 130 may correspond to one or more processes to execute modules and associated specialized hardware of service provider server 120 to update, test, and/or provide decision services 124 and other microservices usable for different computing operations, such as account usage, digital electronic communications, electronic transaction processing, and the like. In this regard, DST platform 130 may correspond to specialized hardware and/or software used by different users, clients, and/or endpoints, such as client device 110, to configure and update common assets, as well as test the common assets, for decision services 124 executed by service applications 122, which may correspond to computing microservices for decision-making during runtime. Decision services 124 may utilize asset metadata 132 in order to test and deploy common assets 134 through procedural generation by machine learning models 136 of asset tests 138. Asset metadata 132 may correspond to one or more data tables or other data structures usable to deploy, test, and/or validate one or more of common assets 134 with new or changes ones of decision services 124.

Service applications 122 may include a transaction processing application corresponding to electronic transaction processing, payment accounts, payment messaging, and the like that may execute and utilize decision services 124 that rely on common assets 134 for data loading, retrieval, and/or processing when providing intelligent decision-making for processing of requests from different clients, devices/servers, and the like. In some embodiments, service applications 122 may include or instead correspond to computing services for social networking, media posting or sharing, microblogging, data browsing and searching, online shopping, and other services that utilize decision services 124 tested and configured using DST platform 130 based on asset metadata 132 and common assets 134.

Service applications 122 may correspond to one or more processes to execute modules and associated specialized hardware of service provider server 120 to process a transaction or provide another service to customers, merchants, and/or other end users and entities of service provider server 120. In this regard, service applications 122 may correspond to specialized hardware and/or software used by service provider server 120 to providing computing services to users, which may include electronic transaction processing and/or other computing services using accounts provided by service provider server 120. Service applications 122 may be used by a user to establish an account and/or digital wallet, which may be accessible through one or more user interfaces, as well as view data and otherwise interact with the computing services of service provider server 120. In various embodiments, financial information may be stored to the account, such as account/card numbers and information. A digital token or other account for the account/wallet may be used to send and process payments, for example, through an interface provided by service provider server 120. The payment account may be accessed and/or used through a browser application and/or dedicated payment application, which may provide user interfaces for access and use of the computing services.

Service applications 122 may utilize decision services 124 that employ common assets 134 for data loads, data processing, and the like during decision service strategy execution, such as to provide intelligent decision-making and other outputs for computing operations. Account services, account setup, authentication, electronic transaction processing, and other computing services of service applications 122 may utilize decision services 124, such as for authentication, electronic transaction processing, risk analysis, fraud detection, and the other decision-making and data processing required by the aforementioned computing services. Decision services 124 may correspond to main decision services used for decision-making using rules-based and/or AI models and engines.

However, various computing tasks of decision services 124 may require updating of common assets 134 used between different services and/or computing services, such as database tables, code updates to executable code, and the like, as well as execution of asset tests 138 to validate and deploy common assets 134 for use by decision services 124. DST platform 130 may include one or more operations and/or tasks that provide code updates and store or share such updates for decision-service updating. For example, code changes to decision services 124 may be performed by one or more users, coders, data scientists, administrators, or the like. With code changes, one or more of common assets 134 shared by decision services 124 may be affected, where those of common assets 134 being changed, updated, or newly deployed may be used by multiple ones of decision services 124. Common assets 134 may include shared data tables, code executable by rules-based and/or ML-based engines, and the like. For example, code changes to decision services 124 and/or common assets 134 may be implemented to provide an update or change that affects execution of decision services 124, such as when loading or processing data for decision-making and outputs. In order to provide for code changes, DST platform 130 may utilize unified requests to share and/or unify such changes that are usable across multiple ones of decision services 124. Further, asset tests 138 may be provided for testing changes and/or uses of common assets 134 with decision services 124 based on those changes, where different ones of asset tests 138 may be procedurally generated by one or more ML models, generative AIs, or other AI engines based on asset metadata 132 for existing asset tests (including their test execution code) and the test requirement parameters for decision services 124 (e.g., the code, execution flow, asset usage, and the like required to validate the common asset can be deployed with the corresponding decision service).

DST platform 130 may utilize an asset validation framework 136 in order to generate unified requests to affect code changes across various shared assets and/or platforms used by decision services 124, as well as generate asset tests 138 procedurally based on asset metadata 132. Asset validation framework 136 may include AI models, such as ML or neural network (NN) models. AI models may generally correspond to any artificial intelligence that performs decision-making, such as rules-based engines and the like. However, AI models may also include subcategories, including ML models and NN models that instead provide intelligent decision-making using algorithmic relationships. Generally, NN models may include deep learning models and the like, and may correspond to a subset of ML models that attempt to mimic human thinking by utilizing an assortment of different algorithms to model data through different graphs of neurons, where neurons include nodes of data representations based on the algorithms that may be interconnected with different nodes. ML models may similarly utilize one or more of these mathematical models, and similarly generate layers and connected nodes between layers in a similar manner to neurons of NN models.

When building ML models for asset validation framework 136, training data may be used to generate one or more classifiers and provide recommendations, predictions, or other outputs based on those classifications and an ML model. The training data may be used to determine input features for training predictive scores and/or outputs associated with affecting a change to a common asset based on one or more code changes and/or generating or reconfiguring asset tests to provide new or updated asset tests for decision services 124 to execute when validating the common asset for usage during decision-making. For example, ML models of asset validation framework 136 may include one or more layers, including an input layer, a hidden layer, and an output layer having one or more nodes, however, different layers may also be utilized. For example, as many hidden layers as necessary or appropriate may be utilized. Each node within a layer is connected to a node within an adjacent layer, where a set of input values may be used to generate one or more output scores or classifications. Within the input layer, each node may correspond to a distinct attribute or input data type that is used to train the ML models.

Thereafter, the hidden layer may be trained with these attributes and corresponding weights using an ML algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden layer nodes may include different algorithms and/or different weights assigned to the input data and may therefore produce a different value based on the input values. The values generated by the hidden layer nodes may be used by the output layer node to produce one or more output values for the ML models. Thus, when the ML models are used to perform a predictive analysis and output, the input may provide a corresponding output based on the classifications trained for the ML models.

The ML models may be trained by using training data associated with the corresponding task, such as generating unified requests for updating decision services 124 with common assets 134 and/or creating asset tests 138 for validation of common assets 134 when being deployed with decision services 123. By providing training data to train the ML models, the nodes in the hidden layer may be trained (adjusted) such that an optimal output (e.g., a classification) is produced in the output layer based on the training data. By continuously providing different sets of training data and penalizing the ML models when the output of the ML models is incorrect, the ML models (and specifically, the representations of the nodes in the hidden layer) may be trained (adjusted) to improve its performance in data classification. Adjusting the ML models may include adjusting the weights associated with each node in the hidden layer. Thus, the training data may be used as input/output data sets that allow for the ML models to make classifications based on input attributes. The output classifications for one or more of the ML models may be classifications predictions, or suggestions associated with unifying code changes and/or creating or changing tests for asset validations.

In this regard, the ML models may be utilized when DST platform 130 performs operations for deploying code changes to decision services 124 and/or common assets 134, such as to generate a unified request that affects the change across multiples ones of decision services 124 to update and/or change usage of and/or dependency on ones of common assets 134 during runtime and/or execution. This may include intelligently configuring and/or generating unified requests that deploy code changes across different ones of decision services 124 by configuring the requests to be compatible with and operate on those of decision services 124 affected by the code change and/or request. The operations to of DST platform 130 to utilize the ML models of asset validation framework 136 for unified request generation are discussed in further detail below with regard to FIGS. 2-3 and 6A.

In further embodiments, asset validation framework 136 may be utilized when DST platform 130 requires testing of common assets 134 when deployed with and/or utilized by decision services 124 during runtime and/or execution. For example, decision services 124 may be changed, updated, or deployed with dependencies on common assets 134 for data loading and/or processing, where common assets 134 may be required to be validated for proper usage by testing to ensure successful decision service execution and output. Common assets 134 may also be updated or have new assets deployed, which may change usage of and/or dependency on different assets by decision services 124, which similarly may require testing and/or validation. As such, asset validation framework 136 may be used to generate asset tests 138, such as using asset metadata 132 that includes designates of previous and/or existing asset tests used to test different ones of common assets 134 and those decision services that executed those asset tests for asset validation. The operations to of DST platform 130 to utilize asset validation framework 136 for new asset validation test generation are discussed in further detail below with regard to FIGS. 4-5 and 6B.

In various embodiments, service applications 122 may further, in particular embodiments, provide additional features for service provider server 120. For example, service applications 122 may include security applications for implementing server-side security features, programmatic client applications for interfacing with appropriate application programming interfaces (APIs) over network 140, or other types of applications. Service applications 122 may contain software programs, executable by a processor, including a graphical user interface (GUI), configured to provide an interface to the user when accessing service provider server 120 via one or more of client devices 110, where the user or other users may interact with the GUI to view and communicate information more easily. In various embodiments, service applications 122 may include additional connection and/or communication applications, which may be utilized to communicate information to over network 140.

Additionally, service provider server 120 includes and/or is associated with database 126. Database 126 may store various identifiers associated with client device 110. Database 126 may also store account data, including payment instruments and authentication credentials, as well as transaction processing histories and data for processed transactions. Database 126 may store financial information and tokenization data. Database 126 may further store data necessary for code changes, unified requests, asset metadata 132, and/or asset tests 138 based on determinations by asset validation framework 136, such as machine or computer executable code or instructions that when executed, cause service provider server 120 to perform various operations or steps, as discussed herein. Although database 126 is shown as residing on service provider server 120 as a database, in other embodiments, other types of data storage and components may be used including cloud computing storage nodes, remote data stores and database systems, distributed database systems over network 140 and/or of a computing system associated with service provider server 120, and the like.

In various embodiments, service provider server 120 includes at least one network interface component 128 adapted to communicate client device 110 and/or other devices and servers over network 140. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

Figure 2:
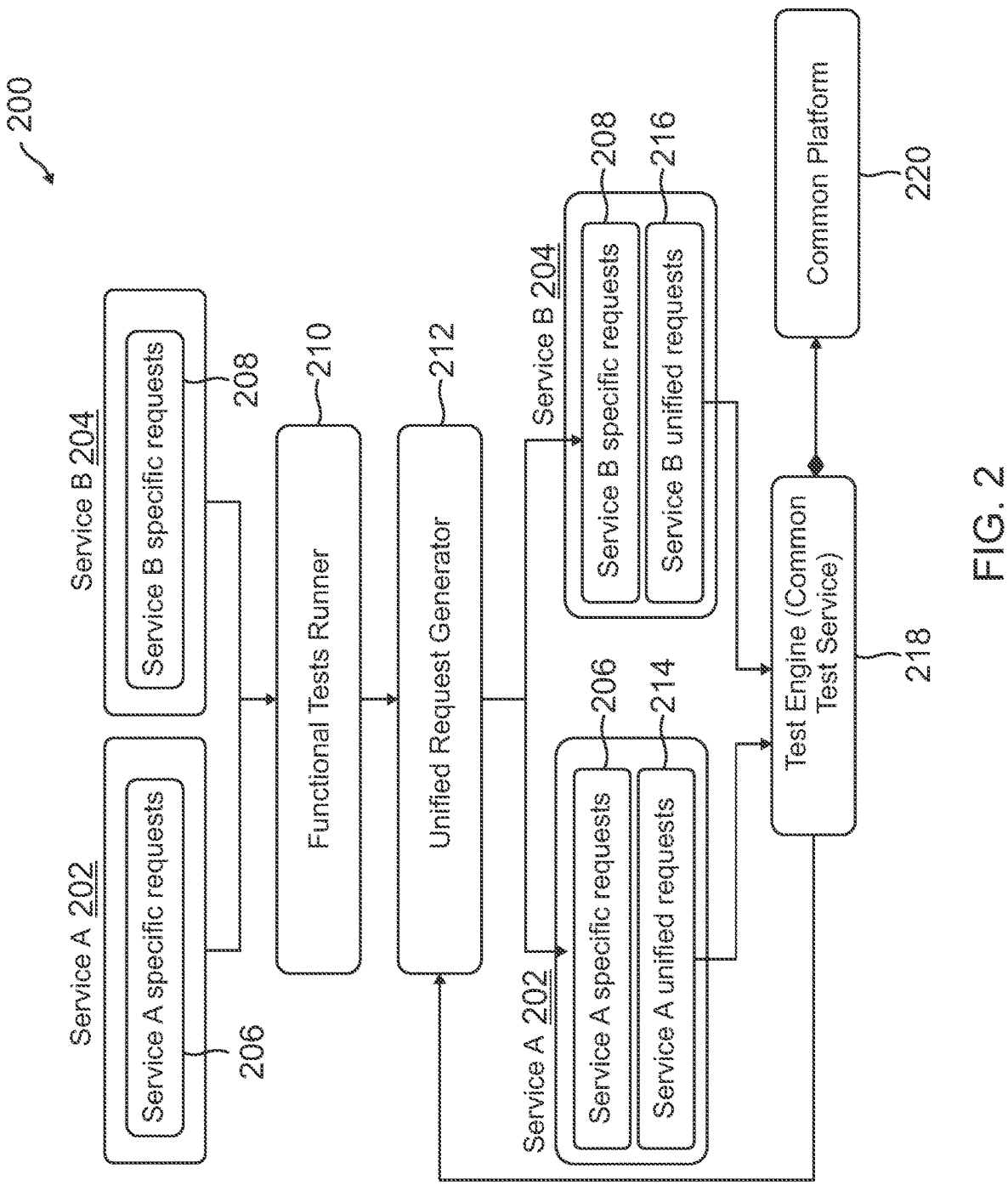
FIG. 2 is an exemplary system environment for unifying asset changes and providing asset validation tests for different decision services using a comment asset, according to an embodiment.

FIG. 2 is an exemplary system environment 200 where a unified request generator may unify requests between different decision services for determination of common asset changes, according to an embodiment. System environment 200 of FIG. 2 includes a service A 202 and a service B 204 for an intelligent execution system and/or decision service engine provided by service provider server 120, such as those of decision services 124 discussed in reference to system 100 of FIG. 1. In this regard, a client device, such as client device 110 discussed in reference to system 100, may provide changes and/or updates to service A 202 and/or service B 204, which may be unified in a corresponding manner for service A requests 206 and service B requests 208 via a functional tests runner 210 and a unifier request generator 212.

In system environment 200, the client device initially requests data processing, such as by providing one or more data loads via a computing service that requires action from a service provider for updating service A 202 and/or service B 204. This may be uploaded and provided to functional tests runner 210 for deployment via service A requests 206 and/or service B requests 208. To avoid duplication of the assets common to multiple services, assets affected by this change and/or data load may be moved to a common platform layer and released as independent artifacts which are then consumed by the services. There may be multiple services and/or users of such common or shared assets, and thus any service may make modifications in the common asset which may affect other services. This may create a spill-over effect with changes to service A 202 and/or service B 204, or other decision services.

When a service requires a change in the common asset, functional tests runner may be invoked to test the change, such as to code, data, or the like, and push the change out to production. At a later time, when a different service consuming the same asset upgrades to the latest version, it may impact the decision service in different ways if the last change that was done by other dependent service is not backward compatible to the service's use case. The same is true for all services that are dependent on the platform for common assets. This can create an impact for multiple parties, entities, and/or computing resources and platforms, such as those involved with the initial change to the common asset, the entities responsible for managing the common platform, and/or the services that depend on the common asset. However, conventionally tests would require independent tests of the change to the common or shared asset across all dependent services that share and/or utilize the shared asset during setup and deployment.

Functional tests runner 210 may interact with unified request generator 212 in order to generate one or more unified requests for service A 202, service B 204, and/or other decision services that utilize the common or shared asset across a common computing platform. In this regard, unified request generator 212 may take a snapshot and create a latest version of a common platform 220 that unifies the decision services and their common or shared asset changes using a test engine 218 with one or more ML models. Unified request generator 212 may, before changes are done to a shared asset on common platform 220, test engine 218 may be used to run all the dependent services for the changes to the shared asset to determine whether the change may be performed and/or context serialized, such as in JavaScript Object Notation (JSON) format.

For example, with unified request generator 212, one of service A requests 206 may request a change that may affect a common asset shared with service B 204. This may be a code change or the like, which may be identified using common platform 220 based on the shared assets or other data. When a change is to be made, unified request generator 212 may execute one or more ML models to identify the shared asset and the sharing between service A 202 and service B 204 based on service A requests 206 and/or service B requests 208. Thereafter, one or more ML models may further be used with test engine 218 in order to generate a unified request, which formats and/or adjusts the change to be compatible for the shared asset with service A 202 and service B 204, such as with service A unified requests 214 and/or service B unified requests 216. This may be done to validate new changes and ensure those changes do not affect dependent services. For example, a change to a common asset code to make the newly added field as optional thereby making the common asset usable for all the services. This may include adding or removing data fields, code, or the like. An example of a change to a common asset that is processed by unified request generator is described below with regard to the following paragraphs and table of the description of FIG. 2.

Service A 202 and service B 204 may utilize a single common asset, such as account information including account details (e.g., a balance, identifier, etc.), which may be loaded by making a call to a downstream service for data. The mandatory parameters for loading the account details or information may correspond to an account number, which is required to make the call to the downstream service. In this example, service A 202 may require additional information from the downstream service, which may require the need to pass another parameter, such as "is the account active?" (isAccountActive) parameter. Thus, the owner or developer of service A 202 may adjust the common asset account to accept two or more parameters when a call is made for loading of account details. This may be tested using functional tests runner 210.

Since the common asset has been changed, other services that utilize the common asset may be identified. Unified Request Generator 212 may be used to generate service A unified requests 214 and/or service B unified requests 216, which may be used by test engine 218 to test the change to the common asset and the effect and/or deployment of the change to the common asset on common platform 220. If the change fails with service B 204, changes to the common asset, a trained ML model and/or engine, and/or a recommendation module may adjust the change and/or decision services and notify service owners or developers of the change. For example, a change to a common asset code may be recommended to make the newly added field as optional or to implement with service B 204. Code of decision services may also be recommended and/or changes to operations of the decision services may be suggested. Further, a suggestion may be made to pass a default or null value in place of the new field and/or change. An exemplary table demonstrating asset code changes is shown in the following Table 1:

the decision services (e.g., decision service A 314, decision service B 308, and/or decision service C 310) that utilize the common or shared asset and thereafter determine, at action 312, whether there is a recommendation or unified request for the change to the common asset. The unified request may be based on and/or determined using a ML engine that unifies the change to the shared asset to be compatible over multiple decision services and/or computing platforms.

Thereafter, at action 316, the action taken is captured, which may then be used to provide the action to the decision services and/or train or retrain an ML model. For example, the action taken may be used in notifications and/or other

TABLE 1

| Service | Field | Parameters | Actual Result | Result | Change by recommendation module |
|---|---|---|---|---|---|
| Service A 202 | getAccountDetails | account number, isAccountActive | Account details loaded | 🔲 | Make isAccountActive optional |
| Service B 204 | getAccountDetails | account number | Exception in obtaining Account details | ✖ | Suggest Service B to pass default value for isAccountActive field. |

Figure 3:
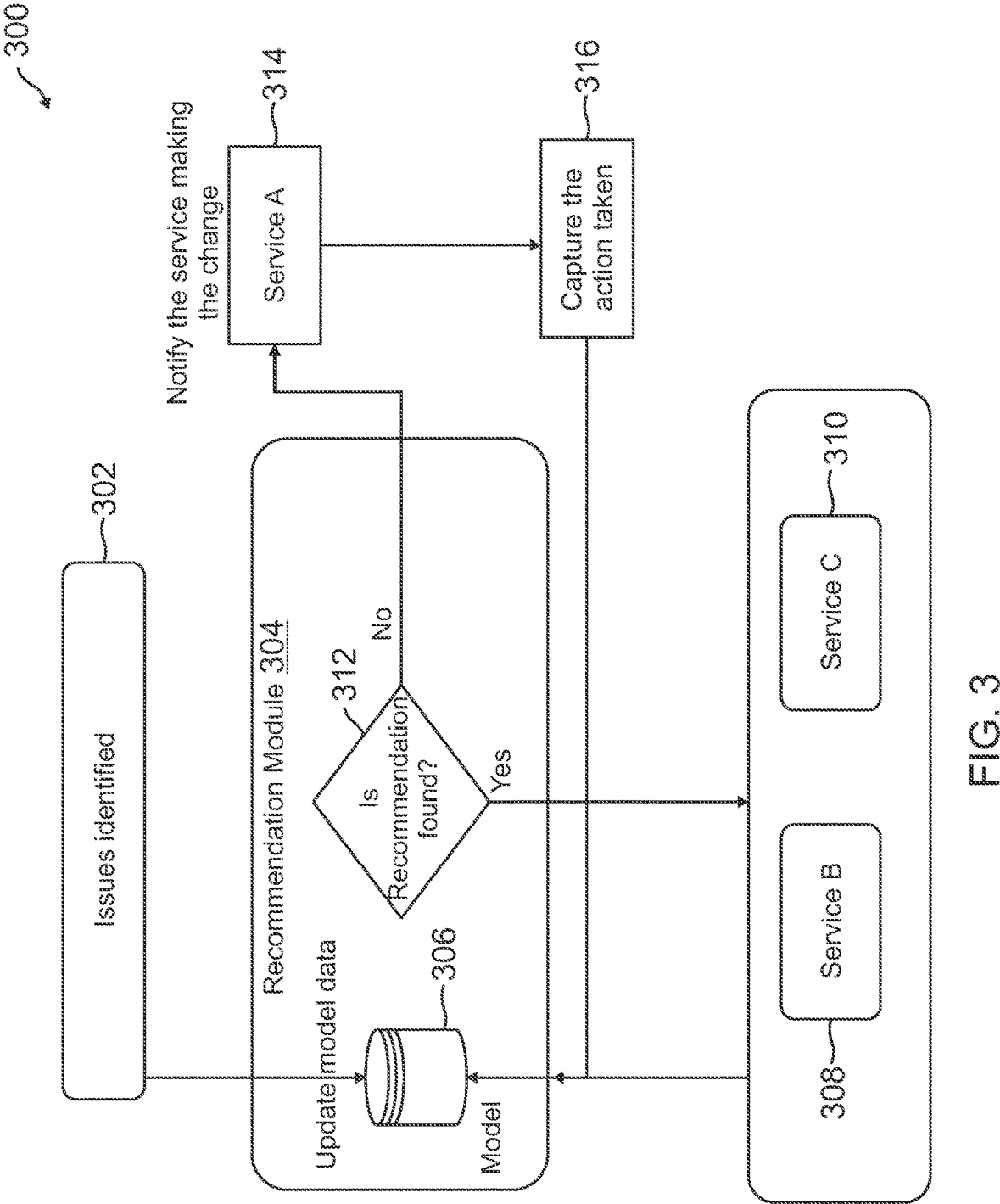
FIG. 3 is an exemplary diagram of operations for an automatically managing an asset validation framework for platform-based microservices, according to an embodiment.

FIG. 3 is an exemplary diagram 300 of operations for an automatically managing an asset validation framework for platform-based microservices, according to various embodiments. Diagram 300 includes a flow executable by service provider server 120 for generating a unified request for an update or change to a common asset for a corresponding one or more of decision services 124 discussed in reference to system 100 of FIG. 1. Diagram 300 may correspond to an execution flow of service provider server 120 that dynamically and intelligently provides recommendations and/or unified requests for changes or updates to be made to common assets among decision services, such as to software code, a software library, an application programming interface (API), and/or the like.

In diagram 300, the execution flow having paths begins when issues are identified at action 302, which may correspond to or based on an initial input code, change, and/or request for an update to a common or shared asset. The execution flow may provide the issues to a recommendation module 304, such as based on a change to a service A 314 that is notified of making the change to the corresponding data asset, such as a data table, computing code, ML model asset or attribute, or the like. In order to make the change to service A 314, diagram 300 then moves to having the model data or the like updated in a database repository 306 corresponding to the changed or updated data for the common or shared asset. This may include executing and/or processing the requested update or change to the data in database repository 306 by recommendation module 304.

Thereafter, in diagram 300, recommendation module 304 may identify a service B 308 and a service C 310, and a snapshot of the platform corresponding to the different decision services may be captured during a snapshot action. The identified issues and the snapshot of the platform may be used to train one or more AI models, such as rules-based and/or ML-model based engines that allow recommendation module 304 to make changes to impacted services and/or notify the owners, administrators, coders, and/or other users that manage or are associated with the corresponding decision services. For example, the snapshot action may be used to capture the state of the computing platform to determine data that may be provided to decision services, update decision services, and/or provide additional functionality. Further, at action 316, the ML model may be further adjusted and/or retrained based on acceptance or refusal of the change to the shared asset by different owners or coders of the decision services. For example, the change to the shared asset may make such asset incompatible with or more inefficient for usage with one or more decision services, and therefore be refused from usage, while others may be accepted for use. Based on the feedback, the ML model may be further trained.

Figure 4:
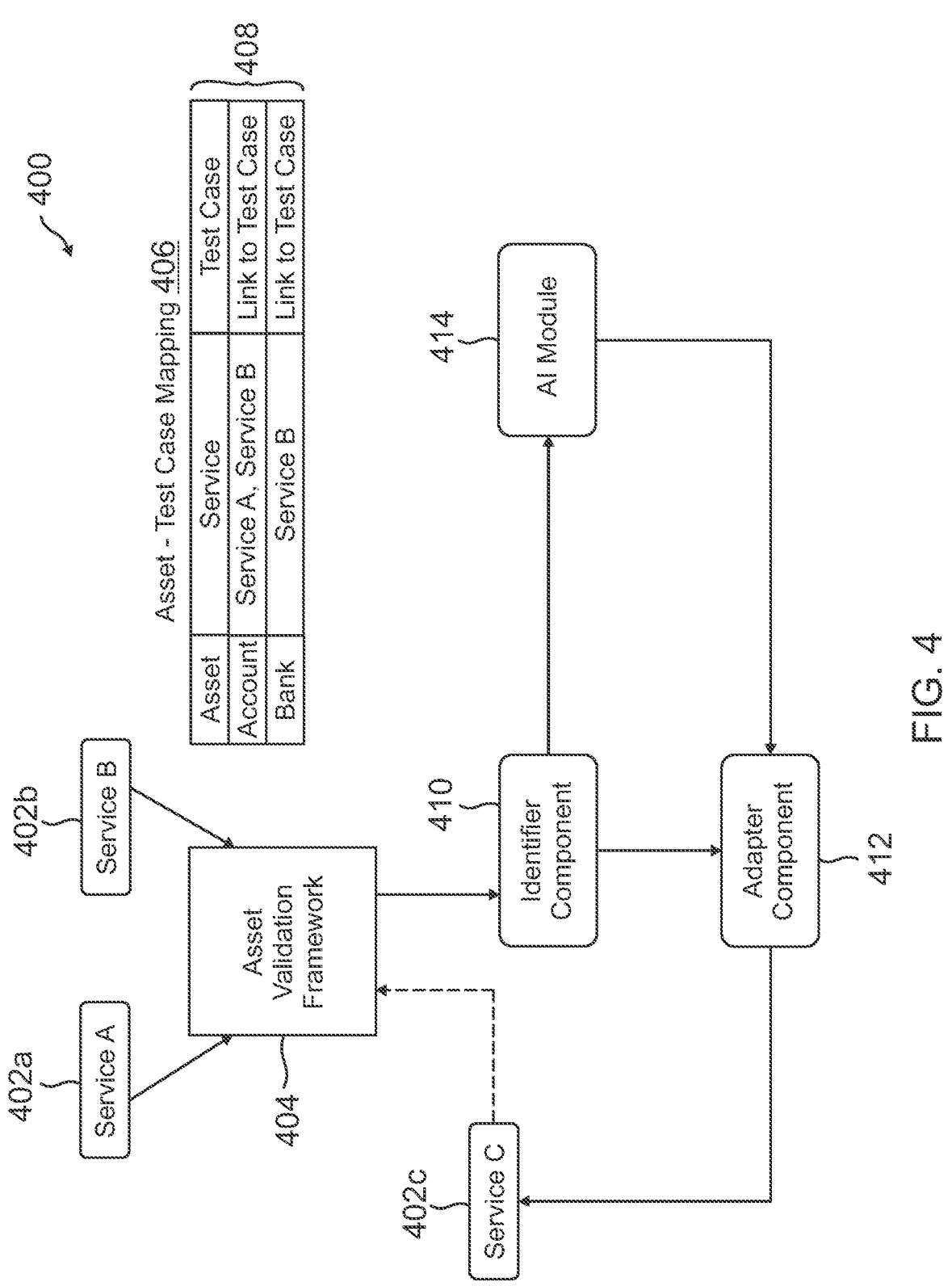
FIG. 4 is an exemplary system environment for an asset validation framework for platform-based microservices that automatically generates common asset validation tests, according to an embodiment.

FIG. 4 is an exemplary system environment 400 for an asset validation framework for platform-based microservices that automatically generates common asset validation tests, according to an embodiment. System environment 400 of FIG. 4 includes a service A 402a and a service B 402b, and a service C 402c provided by service provider server 120, such as decision services 124 discussed in reference to system 100 of FIG. 1. In this regard, a common asset may be deployed, changed, or updated such that usage of the asset may be required to be validated by services A-C 402a-c. As such, an asset validation framework 404 may be provided to validate the asset by procedurally and automatically generating asset tests based on existing asset tests, test requirement parameters, and the like.

Initially, services A-C 402a-c may be onboarded to asset validation framework 404 such that existing asset tests used for assets (e.g., rule data assets or dependencies, ML model features or variables, etc.) validated by each of services A-C 402a-c may be identified, run, and/or determined. For example, with service A 402a and service B 402b, asset validation framework 404 may generate a metadata file for asset-test case mapping 406, shown as a table 408 having columns for assets, services that utilize or have dependencies in executables on such assets, and test cases for asset validations. Service C 402c is then shown as onboarding and requiring use of one of the assets, such as an account data asset or bank data asset using in transaction processing and/or payment account usage from table 408 of asset-test case mapping 406. Service C 402c may utilize asset validation framework 404 to procedurally generate an asset validation test to validate and verify the data asset will work with and be properly utilized during execution of rules, ML models, or the like of service C 402c.

To create an asset test to validate the asset for usage by service C 402c, asset validation framework 404 may interact with an identifier component 410 and an adapter component 412, which may rely on an AI module 414 having NNs, ML models, or other AI models and/or components that intelligently and procedurally generate asset tests using the metadata file for asset-test case mapping 406. For example, identifier component 410 identify that service C 402c does not have coverage for an asset or has added/changed a feature that uses an asset. Identifier component 410 may then check table 408 of asset-test case mapping 406 to determine the test cases for the asset and their corresponding location and/or availability with other decision services (e.g., service A 402a and/or service B 402b), which allows for retrieval of test execution code and/or data for the tests used to validate the asset with the other decision services. Identifier component 410 may then send the relevant data for the identified test cases for the asset, test requirements and parameters for testing the asset, and other required information to adapter component 412 and AI model 414 to adapt previous and/or existing test cases for use by service C 402c when validating the data asset for use.

Adapter component 412 may utilize AI module 414 to adapt the existing tests from past test cases and generate a new test for the newly required test case by service C 402c. This may include deleting or removing unwanted code from the test execution code per the test requirements of service C 402c. In some embodiments, code may be required to be generated, such as through a generative AI or the like that may generate lines of code for service C 402c using existing test execution code and/or test requirement parameters of service C 402c (including code framework, language, execution requirements and/or environment, etc.). For example, AI module 414 may include one or more ML models trained to perform test adaptation to different decision services and for different assets. During execution and inference, historical data from identifier component 410 and adapter component 412, including original test cases from service A 402a and service B 402b, may be collected for the adapted test case for service C 402c.

Adapter component 412 may process the collected data to tokenize data for features and remove or add parameters, which allows for extraction of relevant information. The information may be input to AI module 414, including the original test cases, for adaptation to new and/or updated test case(s) for service C 402c. AI module 414 may compare different suggestions and feedback through reinforcement learning to train for better quality test case, which improves the ML model(s) over time. As such, a feedback loop may process feedback on AI suggests for test case adaptation and, if a suggestion leads to successful adaption, positively reinforce learning for better outputs. The output by adapter component 412 and/or AI module 414 may then be the new or updated asset test(s) for service C 40c having added or removed fields enabling service C 402c to test and validate the common and shared asset.

Figure 5A:
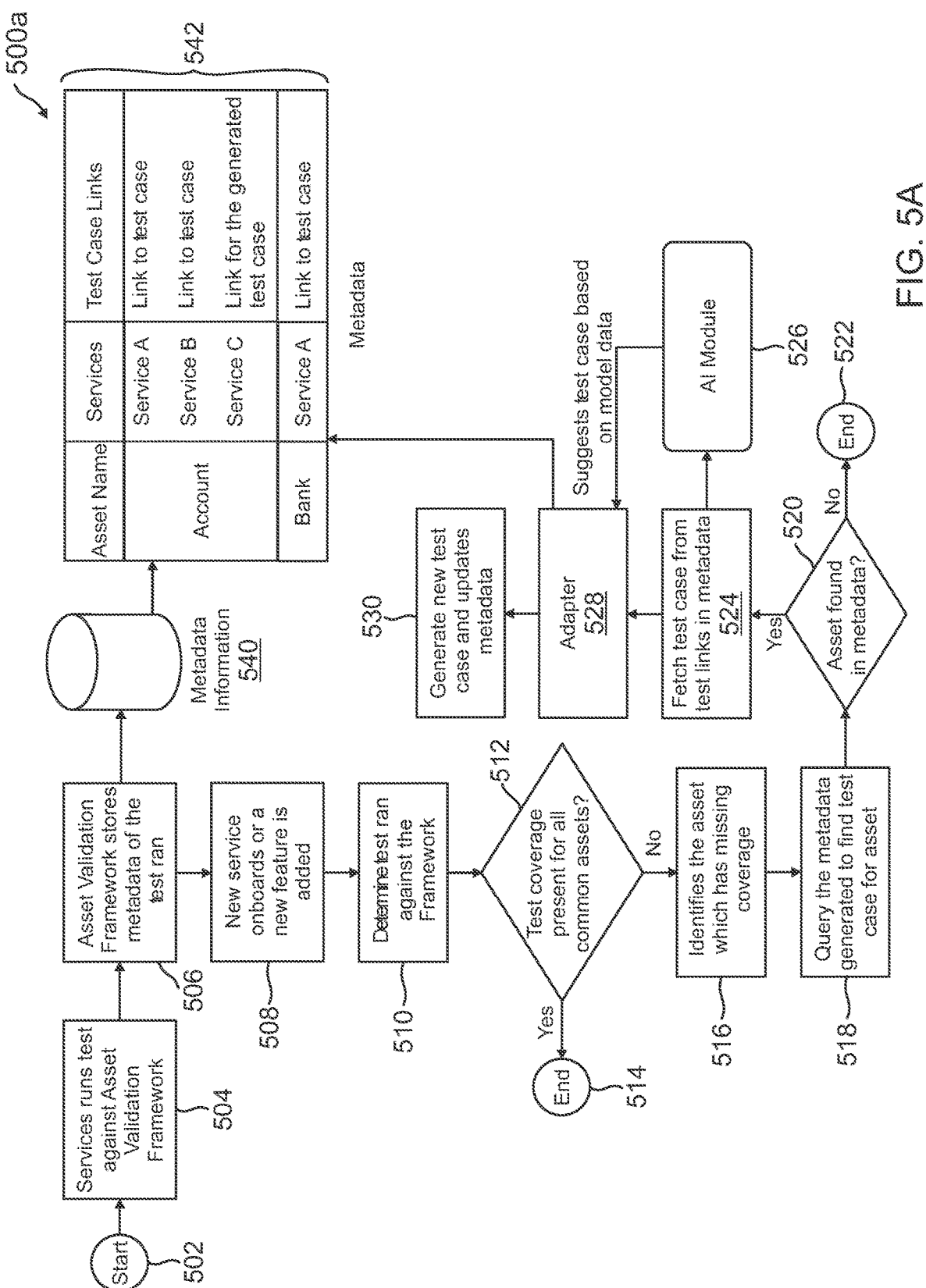
FIG. 5A is an exemplary diagram of operations for automatically generating asset validation tests for common assets using an asset validation framework for platform-based microservices, according to an embodiment.

FIG. 5A is an exemplary diagram 500a of operations for automatically generating asset validation tests for common assets using an asset validation framework for platform-based microservices, according to an embodiment. Diagram 500a displays an exemplary flow of operations that may be executed by DST platform 130 of service provider server 120, discussed in reference to system 100 of FIG. 1. In this regard, the operations may be executed to intelligently and procedurally generate asset tests to validate assets for decision services using a metadata file or table from collected metadata from past test cases and existing asset tests for asset validations, which is shown in further detail with regard to FIG. 5B.

Figure 5B:
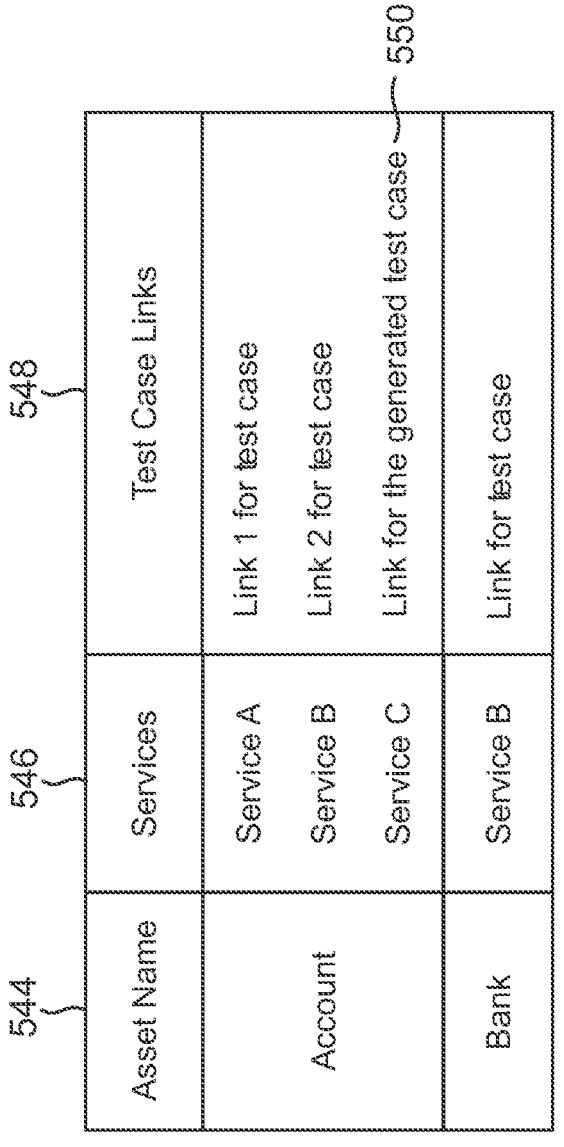
FIG. 5B is an exemplary table of metadata for existing and past executed tests with automatically generated tests of common assets for different microservices, according to an embodiment.

FIG. 5B is an exemplary table 500b of metadata 542 for existing and past executed tests with automatically generated tests of common assets for different microservices, according to an embodiment. Metadata 542 may correspond to the collected metadata from different test cases run for asset validations by decision services, as well newly generated asset tests from existing asset tests and run test cases. Thus, metadata 542 may be used when intelligently generating asset tests for asset validations by decision services when newly utilizing a common asset. As such, diagram 500a of FIG. 5A is discussed with reference to table 500b of FIG. 5B.

Diagram 500a begins at step 502, where initiation of a process to generate asset tests for asset validations may start. At step 504, services run tests of common assets when deploying, using, or otherwise creating dependencies on the common assets for data loading and processing, such as features or variables used by ML models, rule-based engines, and the like. This process may be used to create metadata 542, where the tests run against the asset validation framework may correspond to tests that have been coded, generated, and/or provided to the asset validation framework initially to establish a base set of tests for test creation. At step 506, the asset validation framework stores metadata 542 in a table, file, or other data structure of the tests that have been run. For example, a metadata information database 540 may include metadata 542 that may be accessible to the asset validation framework for future asset test creation requests and/or operations.

At step 508, a new service may be onboarded or a new feature (or other data asset) is added by an existing service. In this regard, a code change to an existing data asset or decision service may mandate a change in data asset usage and/or dependency such that a new data asset is changed and/or added with an existing service. In other embodiments, a new data asset may be deployed, which may be newly used and/or replace existing data assets. To verify and validate usage of the data asset by the decision service(s), at step 510, tests ran against the asset validation framework are determined. To determine this data, metadata information database 540 is accessed and metadata 542 is looked up and parsed for corresponding data. Thus, at step 512, it is determined if test coverage is present for all common assets. If yes, then diagram 500a proceeds to step 514, which ends and an existing test may be used for asset validation.

However, if coverage is not present for all common assets, diagram 500a proceeds from step 512 to step 516 where an identifier component is used to identify the data assets that have the missing coverage. To identify the data assets having missing coverage, metadata 542, code changes, and/or asset deployment requests are parsed and processed to determine those data assets being designated for use and/or deployment with decision services and which do not have a corresponding test for that use/deployment. Once identified, at step 518, metadata 542 is queried to find past test cases and existing tests for the data asset. The past test cases may correspond to tests of the data asset used for validation of the data asset by other decision services that were previously executed. These may be used to identify test execution code for new test generation.

At step 520, it is determined if the asset, and therefore test cases, are found in metadata 542. If not, at step 522, diagram 500*a* ends where an asset test may be required to be generated by another party or entity, such as a system engineer or the like that may provide initial tests for data asset validations of a particular data asset. However, if test cases are found for the data asset, at step 524, the test cases are fetched from the links in metadata 542. For example, referring to diagram 500*b* of FIG. 5B, metadata 542 includes three columns, an asset name column 544, a services column 546, and a test case links column 548. When querying metadata 542 for a data asset, such as an account asset to load account data, services column 546 may be used to identify the services that have run tests and test case links column 548 may be used to link to and access test case data, including test execution code and the like, which may be used for new test creation and/or updating of existing tests for a new decision service, such as a service C that may utilize the account data asset.

Referring back to FIG. 5A, at step 526, an AI module may be invoked to process the test cases and adjust and/or change the existing tests and test cases for the new decision service, such as the service C. The AI module may include NNs, ML models, or other AI models and engines trained based on past and existing tests and test cases, as well as the code frameworks, test requirements, and execution environments for testing data assets with different decision services. The AI model may correspond to a generative AI that may make suggestions on code changes, additions, and/or deletions, such as fields for data input and the like that may be used by different decision services. As such, the AI model may provide test case suggestions to an adapter component, which, at step 528, adapts those test cases to the new decision service C requiring an asset test for validating the data asset. The adapter component may perform the changes to the existing tests and test cases so that a new test may be run by decision service C.

At step 530, the new test case is then generated and metadata 542 is updated so that the decision service may run the new test for validating the data asset for usage. Asset test generation may be performed by removing unnecessary test code for one or more existing asset test(s) from execution, changing test code dependencies and/or fields in the existing asset test(s) for the new decision service that will be executing the new asset text, and/or generating new test code for the new decision service (e.g., based on the existing asset test(s)). Generation of changes to the existing asset test(s) may be performed by a generative AI that may generate new computing code and/or changes to computing code through knowledge and processing of the existing asset test(s). After generation of the new asset test, metadata 542 includes a link to the new asset test and new test case that has been run by the new service, service C, shown as a new test link 550 in metadata 542 in diagram 500*b*. Further, an execution of the test may be run by the decision service, such as service C, to test the data asset and validate that the data asset may be used during decision service execution.

FIG. 6A is a flowchart 600*a* of an exemplary process for automatically managing an asset validation framework for platform-based microservices, according to an embodiment. Note that one or more steps, processes, and methods described herein of flowchart 600*a* may be omitted, performed in a different sequence, or combined as desired or appropriate.

At step 602 of flowchart 600*a*, data processing requests for decision services of a service provider are monitored. The data processing requests may be monitored and/or collected based on changes to computing tasks, node health and/or failures based on changes, uploaded requests for changes based on the data processing requests, causes of those changes, and other data that may be associated with the data processing requests for changes to common assets shared between different decision services of the service provider. The data processing requests may be uploaded and/or provided by one or more coders, users, administrators, or the like to a data repository and/or test service that tests and/or deploys the data processing requests that may be associated with one or more common assets shared between the decision services.

At step 604, a change to a data asset associated with the decision services is received. The change may be caused by one or more updates to data assets, such as to improve functionality, efficiency, prevent operational failures and/or bad data loads, and/or fix issues in network communication, among other required implemented changes to improve computing platform and/or data asset usage. The change may correspond to a change or formatting of one or more data tables or other data records. However, other changes may include those to computing code and the like that may be implemented with decision services, such as when using a test service to test and/or deploy computing code changes to different decision services and/or common assets utilized by those decision services. For example, a common asset may include attributes and/or other independent artifacts that are utilized by a common platform layer to be shared and consumed by multiple computing services.

At step 606, it is determined whether the data asset is shared between multiple ones of the decision services using an ML engine. When the change is made, a snapshot version of the common platform may be generated, which may be utilized by the test service when testing and/or deploying the change to the common or shared asset. This may also allow for identification of the decision services, microservices, and/or other computing services that utilize the common or shared asset. The snapshot of the common platform may be used to identify those sharing and/or utilizing the data asset, which may also be identified and/or classified using the ML engine.

At step 608, a unified request is generated based on the ML engine, data asset, and change. The unified request may be adjusted and/or changed by the ML engine in order to provide a more unified and/or recommended change to the common asset that is compatible across the decision services of the service provider. The unified request may include changes to data tables, computing code, or the like in order to unify the change across the decision services. The ML engine may then provide one or more proposed recommendations and/or changes that may be implemented and/or recommended across multiple decision services, computing platforms, code resources or repositories, and the like. At step 610, the unified request is distributed to the decision services, such as to update and/or implement one or more changes to the data asset that is shared based on the unified request. A recommendation module that is associated with the test service and/or unified request generator may also provide a notification, message, and/or implement a code or data change based on the unified request. This may be distributed to the decision services that utilize the shared asset.

FIG. 6B is a flowchart 600*b* of an exemplary process for automatic generation of common asset validation tests for platform-based microservices, according to an embodiment. Note that one or more steps, processes, and methods described herein of flowchart 600*b* may be omitted, performed in a different sequence, or combined as desired or appropriate.

At step 612 of flowchart 600*b*, it is determined that an asset test is required to validate a data asset for use by a first decision service. For example, a new data asset may be deployed or an existing one updated (e.g., code change, dependency to different data sources, etc.). Further, decision services may be updated, deployed, or the like that have dependencies on data assets for loading and processing data during runtime and execution to provide intelligent decisioning and outputs. As such, the first decision service may utilize a data asset that is commonly shared and/or used by other decision services, such as a second decision service of the corresponding service provider and/or decisioning system. However, to verify the data asset is capable of being used properly and does not lead to errors, improperly loading or data processing, or the like, an asset validation test may be required to be executed by the first decision service to test the data asset.

At step 614, an existing asset test executed by a second decision service to previously validate the data asset for use by the second decision service is determined. The existing asset test may have previously been executed, run, and/or used during a test case of the data asset by the second decision service. In this regard, the existing asset test may include test execution code or the like, which is used to run or utilize the data asset in a test or experimental environment or execution of the second decision service and validate that the data asset is proper and can be used by the second decision service. The existing asset test may be determined using a metadata file and/or table, which includes rows identifying different assets, services utilizing the assets, and links to their existing test cases (including the tests and/or test execution code for the tests run during the cases). To gather the data for the existing asset test(s) and other requirements to generate a new or updated asset test for the first decision service, an identifier component of an asset validation framework may be used to access and parse metadata, as well as communicate with the decision services for test case data.

At step 616, the asset test is automatically generated, by one or more ML models, using the existing asset test and test requirement parameters for the first decision service. An asset test may correspond to executable code that may be executed to test deployment of the common asset with the decision service. The asset test may be run in a test environment and used ensure that the decision service would operate correctly and not lead to failures, errors, incorrect decision-making, or the like when the decision service is run in a production computing environment using the common asset. For example, an asset test may include one or more operations that test or identify whether, when the common asset is deployed with the decision service, the decision service operates correctly and leads to expected decisioning and output from data processing requests.

The ML model(s) may correspond to a generative AI, NN, or the like that may be configured to add and/or remove code, fields, and the like from existing asset tests to adapt the asset tests to the test requirement parameters of different decision services. In this regard, the ML model may interact with an adapter component to suggest and/or perform changes to existing asset tests that allows for adaptation of such tests to the first decision service requiring the test. The existing tests may be adapted by changing or reconfiguring the test execution codes based on test requirement parameters of the first decision service. A generative AI may be used to suggest and/or procedurally generate new code for asset tests, such as new lines of code that may be executed, changes in code dependencies and/or fields for code of existing asset tests, or the like, which may be used when generating the asset test.

At step 618, the asset test is output and/or executed for a validation of the data asset by the first decision service. In this regard, the asset test may be output after adaptation by the adapted component with the ML model(s) of an AI module or engine. The asset test may be made available after output through a link to the asset test and availability of a test case to be run by the first decision service to verify the asset. Thus, the first decision service may then execute a test of the data asset using the test and a resulting test case may be provided for the asset validation framework to update the metadata file or table of existing asset tests and test cases. Thus, the asset test may also be made available for further creation of additional asset tests that validate the data asset or other data assets by decision services.

Figure 7:
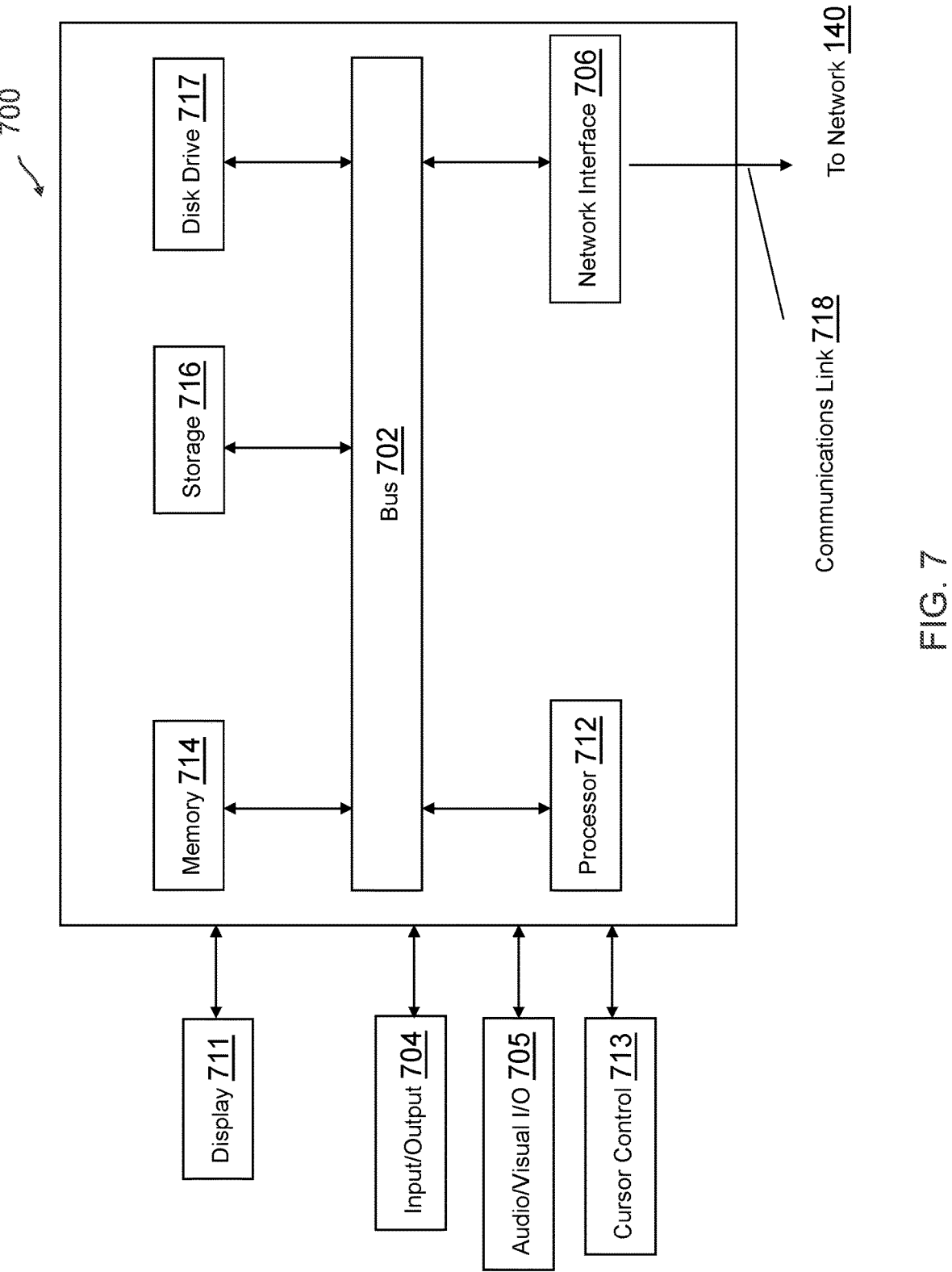
FIG. 7 is a block diagram of a computer system suitable for implementing one or more components in FIG. 1, according to an embodiment.

FIG. 7 is a block diagram of a computer system 700 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons, image, or links, and/or moving one or more images, etc., and sends a corresponding signal to bus 702. I/O component 704 may also include an output component, such as a display 711 and a cursor control 713 (such as a keyboard, keypad, mouse, etc.). An optional audio input/output component 705 may also be included to allow a user to use voice for inputting information by converting audio signals. Audio I/O component 705 may allow the user to hear audio. A transceiver or network interface 706 transmits and receives signals between computer system 700 and other devices, such as another communication device, service device, or a service provider server via network 140. In one embodiment, the transmission is wireless, although other transmission mediums and methods may also be suitable. One or more processors 712, which can be a micro-controller, digital signal processor (DSP), or other processing component, processes these various signals, such as for display on computer system 700 or transmission to other devices via a communication link 718. Processor(s) 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor(s) 712 and other components by executing one or more sequences of instructions contained in system memory component 714. Logic may be encoded in a computer readable medium, which may refer to any medium that participates in providing instructions to processor(s) 712 for execution. Such a medium may take many forms, including but not limited to, non-volatile media, volatile media, and transmission media. In various embodiments, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and one or more hardware processors coupled to the non-transitory memory and configured to execute the instructions to cause the system to:
determine a first decision service of a plurality of decision services that uses an asset test to validate a data asset for use by the first decision service during processing of different requests from clients of an online service provider, wherein the data asset corresponds to shared data from a data resource;
select an existing asset test previously used by a second decision service of the plurality of decision services to validate the data asset for use by the second decision service;
process the existing asset test using a machine learning (ML) model trained to identify and perform changes to adapt different asset tests to different ones of the plurality of decision services, wherein processing the existing asset test using the ML model is based on test execution code for the existing asset test and test requirement parameters for the first decision service; and
automatically generate the asset test for the first decision service based on the processing.

2. The system of claim 1, wherein determining the first decision service includes selecting the data asset utilized by the plurality of decision services during processing of the different requests based on a lack of an asset coverage for the data asset with one or more of the plurality of decision services.

3. The system of claim 2, wherein the selecting the data asset is further based on the data asset being newly introduced for use by the plurality of decision services, and wherein the data asset is added to an asset library for the plurality of decision services when newly introduced for use by the plurality of decision services.

4. The system of claim 1, wherein, prior to selecting the existing asset test, executing the instructions further cause the system to:
determine the second decision service of the plurality of decision services that previously validated the data asset;
determine the existing asset test run by the second decision service; and
map the existing asset test to the data asset and the second decision service.

5. The system of claim 4, wherein the existing asset test is one of a plurality of existing asset tests that each validated the data asset for a corresponding one of the plurality of decision services, and wherein processing the existing asset test comprises processing each of the plurality of existing asset tests.

6. The system of claim 4, wherein determining the second decision service and the determining the existing asset test are performed by an identifier component that parses available asset tests run by the plurality of decision services, and wherein processing the existing asset test is performed by an adapter component that configures at least the test execution code for the first decision service based on the test requirement parameters and an output by the ML model.

7. The system of claim 4, wherein executing the instructions further cause the system to:
generate a mapping metadata file of at least the existing asset test mapped to the data asset and the second decision service, and wherein selecting the existing asset test is based on the mapping metadata file.

8. The system of claim 1, wherein the data asset comprises a shared asset used to call a resource for corresponding data, and wherein the shared asset is deployed to be newly shared for use or to update an existing data asset with the plurality of decision services and requires validating prior to use with each of the plurality of decision services.

9. The system of claim 1, wherein executing the instructions further cause the system to:
   create and update metadata associated with a plurality of past asset tests when run over time by the plurality of decision services.

10. The system of claim 1, wherein executing the instructions further cause the system to:
   execute a validation test of the data asset by the first decision service using the automatically generated asset test.

11. The system of claim 1, wherein the ML model trained on historical data including past test cases and past adapted test cases for the plurality of decision services.

12. A method comprising:
   determining an asset test for validating a data asset for use by a first decision service, wherein the data asset is utilized by the first decision service for data processing of requests from requestor clients, and wherein the data asset is shared by a plurality of decision services;
   determining that a second decision service of the plurality of decision services has an existing asset test previously used to validate the data asset for use by the second decision service, wherein the existing asset test comprises test execution code that tests the data asset for a validation of the data asset for the second decision service;
   creating the asset test using the existing asset test and a machine learning (ML) model trained to adapt existing asset tests to validate data assets for the plurality of decision services, wherein the creating reconfigures the existing asset test for the first decision service based on test requirement parameters for the first decision service; and
   executing the asset test with the data asset for the first decision service, wherein the executing automatically validates whether the data asset is usable by the first decision service for the data processing of the requests from the requestor clients.

13. The method of claim 12, wherein the determining the asset test comprises one of:
   receiving a request for the asset test from the first decision service; or
   identifying a lack of an asset coverage for the data asset by the first decision service.

14. The method of claim 12, wherein the data asset comprises a new data asset that replaces a previously used data asset by the first decision service, and wherein the test requirement parameters for the first decision service are based on a use of the previously used data asset by the first decision service.

15. The method of claim 12, wherein the determining that the second decision service of the plurality of decision services has an existing asset test is based on a metadata file mapping the data asset to the second decision service and the existing asset test.

16. The method of claim 15, wherein, prior to the determining the asset test, the method further comprises:
   identifying that the second decision service executed the existing asset test to previously test and validate the data asset with the second decision service; and
   updating the metadata file based on the identifying.

17. The method of claim 16, wherein the metadata file is previously generated based on a plurality of existing asset tests run by the plurality of decision services for a plurality of data assets.

18. The method of claim 12, wherein the ML model trained on historical data including past test cases and past adapted test cases for the plurality of decision services.

19. A non-transitory machine-readable medium having stored thereon machine-readable instructions executable to cause a machine to perform operations comprising:
   receiving a request to validate a data asset for a use by a first decision service of a plurality of decision services, wherein the data asset loads shared data for data processing requests from clients of an online service provider, and wherein the shared data is loaded from a data resource that is shared by the plurality of decision services;
   identifying an existing asset test previously used by a second decision service of the plurality of decision services to validate the data asset for a use by the second decision service;
   accessing an asset test generated from the existing asset test using a machine learning (ML) model trained to adapt the existing asset test to different ones of the plurality of decision services based on existing asset tests run by the plurality of decision services, wherein the asset test is generated by the ML model based on test execution code for the existing asset test and test requirement parameters for the first decision service; and
   testing the data asset for use by the first decision service using the generated asset test.

20. The non-transitory machine-readable medium of claim 19, wherein the testing comprises automatically executing adapted execution code for the asset test from the test execution code and the test requirement parameters with one or more data loads from a shared data resource by the plurality of decision services.

* * * * *